US008543781B2

(12) United States Patent
Rawat et al.

(10) Patent No.: US 8,543,781 B2
(45) Date of Patent: Sep. 24, 2013

(54) HYBRID LOCKING USING NETWORK AND ON-DISK BASED SCHEMES

(75) Inventors: Mayank Rawat, Sunnyvale, CA (US); Jinyuan Li, Mountain View, CA (US); Murali Vilayannur, Sunnyvale, CA (US); Daniel J. Scales, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 694 days.

(21) Appl. No.: 12/565,521

(22) Filed: Sep. 23, 2009

(65) Prior Publication Data

US 2010/0017409 A1  Jan. 21, 2010

Related U.S. Application Data

(63) Continuation-in-part of application No. 11/676,109, filed on Feb. 16, 2007, and a continuation-in-part of application No. 10/773,613, filed on Feb. 6, 2004, now Pat. No. 7,849,098.

(60) Provisional application No. 61/150,094, filed on Feb. 5, 2009.

(51) Int. Cl.
*G06F 12/14* (2006.01)

(52) U.S. Cl.
USPC ........... 711/156; 711/152; 711/154; 711/163; 710/200

(58) Field of Classification Search
USPC ................ 711/152, 154, 156, 163; 710/200
See application file for complete search history.

(56) References Cited

U.S. PATENT DOCUMENTS

| 4,429,360 | A | 1/1984 | Hoffman et al. |
| 5,151,988 | A | 9/1992 | Yamagishi |
| 5,226,159 | A | 7/1993 | Henson et al. |
| 5,251,318 | A | 10/1993 | Nitta et al. |
| 5,414,840 | A | 5/1995 | Rengarajan et al. |
| 5,502,840 | A | 3/1996 | Barton et al. |
| 5,692,178 | A | 11/1997 | Shaughnessy |
| 5,848,241 | A | 12/1998 | Misinai et al. |
| 6,078,982 | A | 6/2000 | Du et al. |
| 6,105,085 | A | 8/2000 | Farley |
| 6,105,099 | A | 8/2000 | Freitas et al. |
| 6,128,710 | A | 10/2000 | Greenspan et al. |
| 6,247,023 | B1 | 6/2001 | Hsiao et al. |

(Continued)

OTHER PUBLICATIONS

Non-Final Rejection Mailed on Nov. 17, 2009 for U.S. Appl. No. 11/676,109, filed Feb. 16, 2007.

(Continued)

*Primary Examiner* — Jasmine Song

(57) ABSTRACT

A method of acquiring a lock by a node, on a shared resource in a system of a plurality of interconnected nodes, is disclosed. Each node that competes for a lock on the shared resource maintains a list of locks currently owned by the node. A lock metadata is maintained on a shared storage that is accessible to all nodes that may compete for locks on shared resources. A heartbeat region is maintained on a shared resource corresponding to each node so nodes can register their liveness. A lock state is maintained in the lock metadata in the shared storage. A lock state may indicate lock held exclusively, lock free or lock in managed mode. If the lock is held in the managed mode, the ownership of the lock can be transferred to another node without a use of a mutual exclusion primitive such as the SCSI reservation.

20 Claims, 9 Drawing Sheets

(56) References Cited

U.S. PATENT DOCUMENTS

| | | |
|---|---|---|
| 6,330,560 B1 | 12/2001 | Harrison et al. |
| 6,389,420 B1 | 5/2002 | Vahalia et al. |
| 6,466,978 B1 | 10/2002 | Mukherjee et al. |
| 6,609,128 B1 | 8/2003 | Underwood |
| 6,622,163 B1 | 9/2003 | Tawill et al. |
| 6,658,417 B1 | 12/2003 | Stakutis et al. |
| 6,842,896 B1 | 1/2005 | Redding et al. |
| 7,089,561 B2 | 8/2006 | Morrison et al. |
| 7,107,267 B2 | 9/2006 | Taylor |
| 7,117,481 B1 | 10/2006 | Agesen et al. |
| 7,124,131 B2 | 10/2006 | Guthridge et al. |
| 7,240,057 B2 | 7/2007 | Kingsbury et al. |
| 7,284,151 B2 | 10/2007 | Chandrasekaran |
| 7,289,992 B2 | 10/2007 | Walker |
| 7,293,011 B1 | 11/2007 | Bedi et al. |
| 7,490,089 B1 | 2/2009 | Georgiev |
| 7,502,752 B1 | 3/2009 | Lemons et al. |
| 7,516,285 B1 | 4/2009 | Haynes et al. |
| 7,552,122 B1 | 6/2009 | Georgiev |
| 7,711,539 B1 | 5/2010 | Kimmel et al. |
| 7,849,098 B1 | 12/2010 | Scales et al. |
| 2002/0016771 A1 | 2/2002 | Carothers et al. |
| 2002/0143704 A1 | 10/2002 | Nassiri |
| 2002/0174139 A1 | 11/2002 | Midgley et al. |
| 2003/0041227 A1 | 2/2003 | Nakamatsu |
| 2003/0065672 A1 | 4/2003 | Kingsbury et al. |
| 2003/0105756 A1 | 6/2003 | Daynes |
| 2003/0225760 A1 | 12/2003 | Ruuth et al. |
| 2004/0073831 A1 | 4/2004 | Yanai et al. |
| 2004/0078658 A1 | 4/2004 | Park et al. |
| 2004/0117580 A1* | 6/2004 | Wu et al. ............... 711/170 |
| 2004/0215670 A1 | 10/2004 | Holenstein et al. |
| 2004/0249838 A1 | 12/2004 | Hinshaw et al. |
| 2004/0268062 A1 | 12/2004 | Ofer |
| 2005/0091238 A1 | 4/2005 | Zane et al. |
| 2005/0149683 A1 | 7/2005 | Chong et al. |
| 2006/0047713 A1 | 3/2006 | Gornshtein et al. |
| 2006/0069665 A1 | 3/2006 | Yamakawa et al. |
| 2007/0083687 A1 | 4/2007 | Rinaldi et al. |
| 2007/0214161 A1 | 9/2007 | Goyal et al. |

OTHER PUBLICATIONS

Final Rejection Mailed on Jan. 29, 2010 for U.S. Appl. No. 10/773,613, filed Feb. 6, 2004.
Final Rejection Mailed on Sep. 29, 2008 for U.S. Appl. No. 10/773,613, filed Feb. 6, 2004.
Non-Final Rejection Mailed on May 27, 2009 for U.S. Appl. No. 10/773,613, filed Feb. 6, 2004.
Non-Final Rejection Mailed on Jan. 9, 2008 for U.S. Appl. No. 10/773,613, filed Feb. 6, 2004.
Non-Final Rejection Mailed on Feb. 17, 2011 for U.S. Appl. No. 12/939,532, filed Nov. 4, 2010.
Final Rejection Mailed on Sep. 13, 2011 for U.S. Appl. No. 12/939,532, filed Nov. 4, 2010.
Final Rejection Mailed on Nov. 10, 2011 for U.S. Appl. No. 12/324,665, filed Nov. 26, 2008.
Non-Final Rejection Mailed on Nov. 10, 2011 for U.S. Appl. No. 11/676,109, filed Feb. 16, 2007.
Final Rejection Mailed on Aug. 6, 2010 for U.S. Appl. No. 11/676,109, filed Feb. 16, 2007.
Non-Final Rejection Mailed on Jun. 9, 2011 for U.S. Appl. No. 11/707,724, filed Feb. 16, 2007.
Final Rejection Mailed on Jun. 6, 2012 for U.S. Appl. No. 11/707,724, filed Feb. 16, 2007.
Non-Final Rejection Mailed on Oct. 1, 2010 for U.S. Appl. No. 11/707,724, filed Feb. 16, 2007.
Final Rejection Mailed on Dec. 2, 2009 for U.S. Appl. No. 11/707,724, filed Feb. 16, 2007.
Non-Final Rejection Mailed on Jun. 24, 2009 for U.S. Appl. No. 11/707,724, filed Feb. 16, 2007.
Non-Final Rejection Mailed on Nov. 16, 2011 for U.S. Appl. No. 11/707,724, filed Feb. 16, 2007.
Non-Final Rejection Mailed on Jul. 20, 2011 for U.S. Appl. No. 12/324,665, filed Nov. 26, 2008.
Helmig, Windows 2000/XP TCP/IP protocol, Feb. 18, 2001, WindowsNetworking.com, http://windowsnetworking.com/articles_tutorials/w2ktcpip.html.
Windows 2000 Support, How to specify an IP address, Last revised Oct. 31, 2006, Microsoft, http://support.microsoft.com/kb/308199.
Venners, Inside the Java Virtual Machine, unknown but at least 1998, Computing McGraw-Hill 2nd Edition, Chapter 5.
The Authoritative Dictionary of IEEE Standards Terms, 2000, IEEE, 7th ed. p. 318.
Non-Final Rejection Mailed on Dec. 19, 2012 for U.S. Appl. No. 11/707,724, filed on Feb. 16, 2007.
Non-Final Rejection Mailed on Nov. 7, 2012 for U.S. Appl. No. 11/676,109, filed on Feb. 16, 2007.
Final Rejection Mailed on Apr. 10, 2013 for U.S. Appl. No. 11/707,724, filed on Feb. 16, 2007.

* cited by examiner

HYBRID LOCKING USING NETWORK AND ON-DISK BASED SCHEMES

CROSS REFERENCE TO RELATED APPLICATIONS

This application claims the benefit of U.S. Provisional Application No. 61/150,094 filed on Feb. 5, 2009. This application is a Continuation-in-Part of U.S. patent application Ser. No. 11/676,109, filed Feb. 16, 2007, and entitled "System and Method for Implemented Distributed Locks via On-Disk Heartbeating" and a Continuation-in-Part of U.S. patent application Ser. No. 10/773,613, filed Feb. 6, 2004, and entitled "Providing multiple concurrent access to a file system," both of these applications are being incorporated herein by reference.

BACKGROUND

Distributed (or cross-host) locks can be used to synchronize operations of multiple nodes (i.e., hosts). Distributed locks may be implemented using a network lock manager (NLM) or alternatively, in systems, where a more reliable storage area network (SAN) is available, using on-disk lease-based locks.

Networks are prone to failure and when the IP network of hosts is not working or the host managing a lock crashes, a new manager for a lock must be "elected", and there are many complicated implementation issues. These systems also have to recover from network partitioning that may give rise to the so called "split-brain" problem wherein the cluster may split into two or more sub-clusters each of which may lay exclusive claim to critical on-disk resources. As a result, NLMs have limits on maximum number of node failures. A NLM may choose to heartbeat to a "quorum" disk as an extra way to help determine if a node is down; clustering software such as Red Hat™ Cluster Suite and VERITAS™ Cluster Service have used the notion of "quorum" disk in the past, although they do not specifically implement locks.

On-disk lease-based locks rely on mutual exclusion primitives such as SCSI-2 reserve/release or SCSI-3 persistent reservation/release that are supported by most disk array controllers. The disk array controller manages the physical disk drives and exposes them to connected computer systems as logical data storage units (DSU), each identified by a logical unit number (LUN). The performance of on-disk lease-based locks depends on the efficacy of the mutual exclusion primitives provided by these storage systems.

In particular, SCSI-2 reservations may be expensive as these operate at LUN granularity and limit access to the DSU to the node holding reservation. Consequently, any other computer system attached to the DSU cannot do IO to the LUN until the duration of reservation is over. SCSI-3 based reservation meanwhile, allow IOs from nodes/initiators other than the node holding the reservation but the overhead of a SCSI reservation/release may still be prohibitive.

SUMMARY

In one embodiment, a method of acquiring a lock by a node, on a shared resource in a system of a plurality of interconnected nodes, is disclosed. Each node that competes for a lock on the shared resource maintains a list of locks currently owned by the node. A lock metadata is maintained on a shared storage that is accessible to all nodes that may compete for locks on shared resources. A heartbeat region is maintained on a shared resource corresponding to each node so nodes can register their liveness. A lock state is maintained in the lock metadata in the shared storage. A lock state may indicate lock held exclusively, lock free or lock in managed mode. If the lock is held in the managed mode, the ownership of the lock can be transferred to another node without a use of a mutual exclusion primitive.

In another embodiment, a method of receiving, at a first node from a second node, a request to release a lock is disclosed. The method includes inspecting a local lock metadata of the first node. A message is sent to the second node indicating that the lock is in use if the local lock metadata includes information indicating that the lock is being owned in an exclusive mode by the first node. If the local lock metadata includes information indicating that the lock is being held by the first node but not in use, the second node removes information of the lock from the local lock metadata and updates information in a heartbeat region corresponding to the lock to grant the lock to the second node. A message is sent back to the second node indicating that the lock is granted. In one embodiment, the request to release is received via an IP network.

In yet another embodiment, a computer readable media for storing programming instructions to perform the following method steps is disclosed: (a) probing a local lock metadata of the node to determine if a lock metadata of the lock exists in the local lock metadata, wherein the lock metadata includes an identity of the lock and a lock status; (b) if the lock metadata does not exist in the local lock metadata, performing steps (i) to (iv): (i) reading shared lock metadata of the lock from a shared storage, the reading includes identifying a current owner of the lock and a current status of the lock; (ii) probing heartbeat region of the current owner of the lock to ascertain if the current owner is alive, wherein if the current owner is not alive, waiting for a lock lease time to run out and then acquiring the lock and updating the shared lock metadata to indicate that the lock is now owned by the node; (iii) if the current status of the lock indicates that the current owner is holding the lock in an exclusive mode, returning a message to the node to notify that the lock is not free; (iv) if the current status of the lock indicates that the current owner is holding the lock in a managed mode, sending a request to the current owner to release the lock, wherein if the current owner has already not released the lock to another requesting node, the lock is granted to the node without performing a mutual exclusive primitive operation on the shared resource, and the shared lock metadata is updated to indicate new lock ownership and lock status; and (c) if the lock metadata exists in the local lock metadata of the node, probing the lock status of the lock in the local lock metadata, if the lock status of the lock in the local lock metadata indicates that the lock being owned in a managed mode, changing the lock status of the lock in the local lock metadata to indicate an exclusive use of the lock by the node and updating the shared lock metadata (without performing a mutual exclusion primitive) to indicate that the lock is being used by the node in an exclusive mode. The managed mode means that the lock is being owned by the node but the lock is not being used by the node.

DETAILED DESCRIPTION

Figure 1:
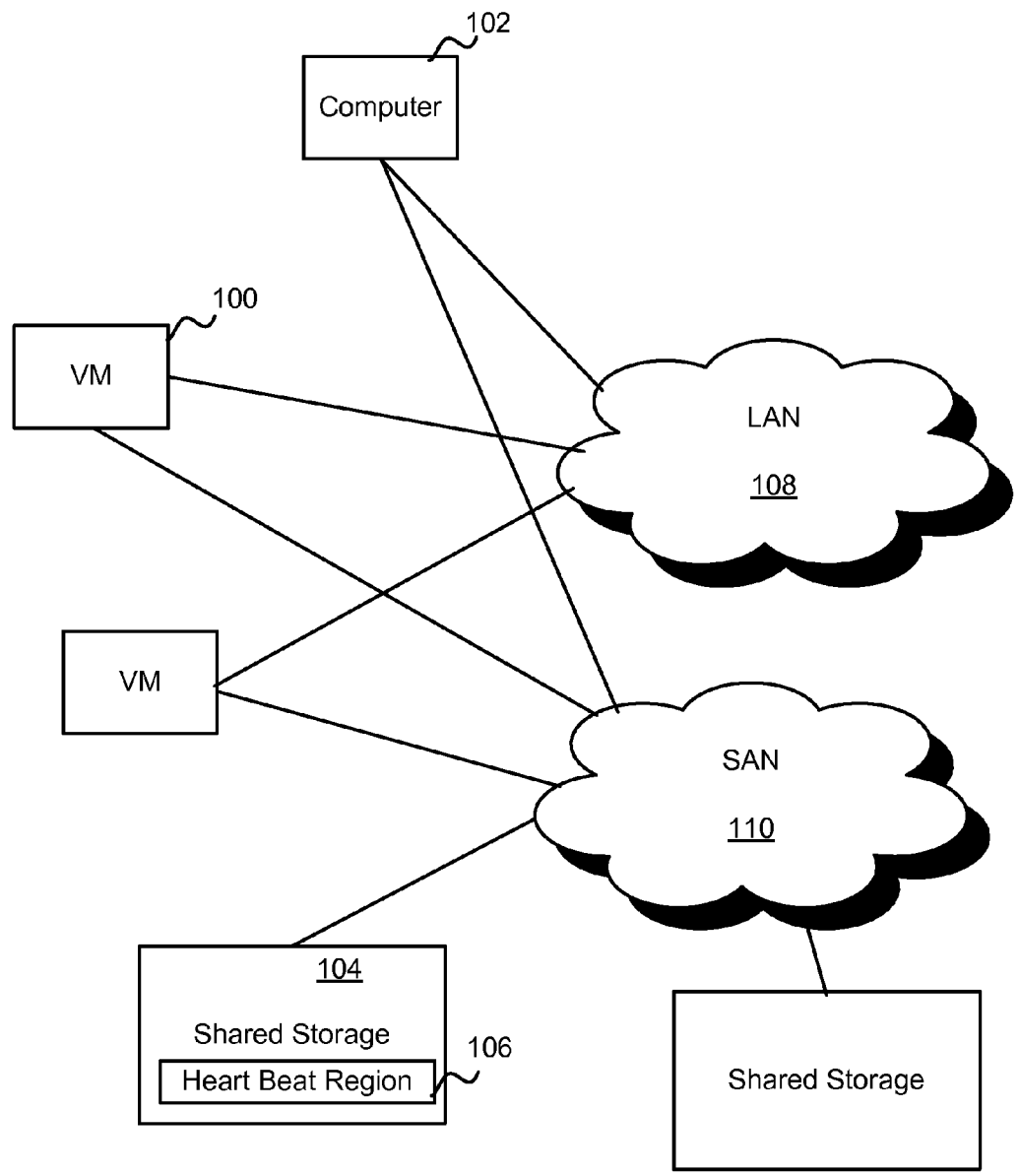
FIG. 1 illustrates a logical diagram of a system for providing hybrid locking in accordance with one or more embodiments of the present invention.

FIG. 1 illustrates a system for providing hybrid locking of shared resources. A resource may be an entity to which shared access must be controlled, typically a file, a record, or an area of shared memory, but can be anything that application designers choose. A node is any entity that is capable of resource ownership. In addition, a node may have optional characteristics of being identified by a persistent identifier within a system and the ability to hold lease-based locks on shared resources. In one or more embodiments, each time a node is rebooted or reinitialized, a different instance of that node is created.

As used herein, the term "node" means any device connected to a computer network. Nodes can be computers, personal digital assistants (PDAs), cell phones, or various other network appliances. On an IP network, a node is any device with an IP address.

In the system illustrated in FIG. 1, any of computers 102 may be a node. In an implementation of the present invention in a virtual machine environment, any of virtual machines 100 may be considered a node. In one or more embodiment, a node obtains control over a resource with a lock. Locks obtained by a particular node instance are associated with a single heartbeat. The heartbeat is implemented as a data structure on a disk that contains various information for identifying a particular node instance. Locks are also implemented as data structures on a disk that contain information for identifying a node instance owning a lock and an address of the node's corresponding heartbeat.

The system of FIG. 1 includes a shared storage 104, which includes a heartbeat region 106 to store the locking information. Shared resources and nodes are interconnected using a Local Area Network (LAN) 108, which may be the Internet, a local area network, or a wide area network, and a Storage Area Network (SAN) 110. In one embodiment, SAN 110 and LAN 108 may be the same network. It may be noted that the embodiments described herein may be practiced in non-virtualization environments as well as virtualization environments.

Figure 2:
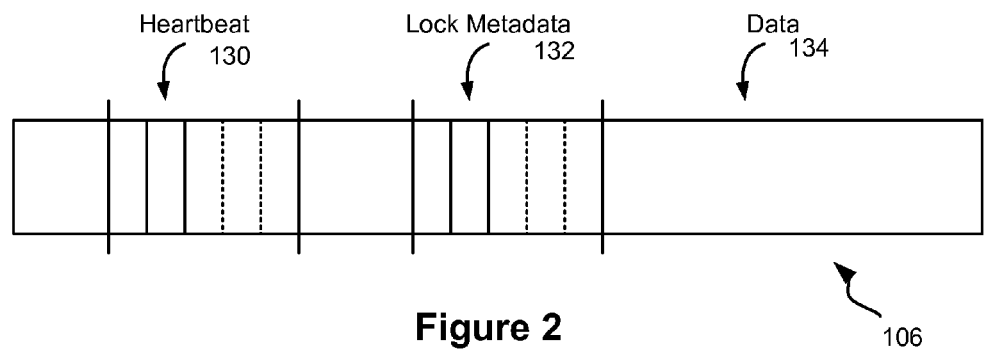
FIG. 2 illustrates a logical diagram of a section of storage to store lock information in accordance with one or more embodiments of the present invention.

FIG. 2 illustrates a logical diagram of heartbeat region 106 in a shared storage. Heartbeat region 106 includes storage structures for storing Heartbeat data 130, Lock metadata 132 and other lock related data 134 that may be necessary to implement the locking methods as described later in this document. In one embodiment, Heartbeat data storage 130 and Lock metadata storage 132 are accessible to all nodes in the network 108. However, this accessibility is subject to network failures. In other embodiments, lock metadata could also be stored in a region separate from the heartbeat region.

In one or more embodiments, each host or a node has a heartbeat region 106 for every file system to indicate liveness of the node. In one embodiment, the liveness of a node is indicated by the node's ability to update the node's heartbeat data in the heartbeat region. For example, a node may lose its ability to update the heartbeat data if the node becomes inoperable due to malfunctioning or heavy load or gets disconnected from the network. A node changes the state of a particular lock metadata region after acquiring a lock so that other nodes can determine owners of particular locks at a given time. Similarly, when a lock is released, the lock status is updated in the corresponding lock metadata region.

Figure 3:
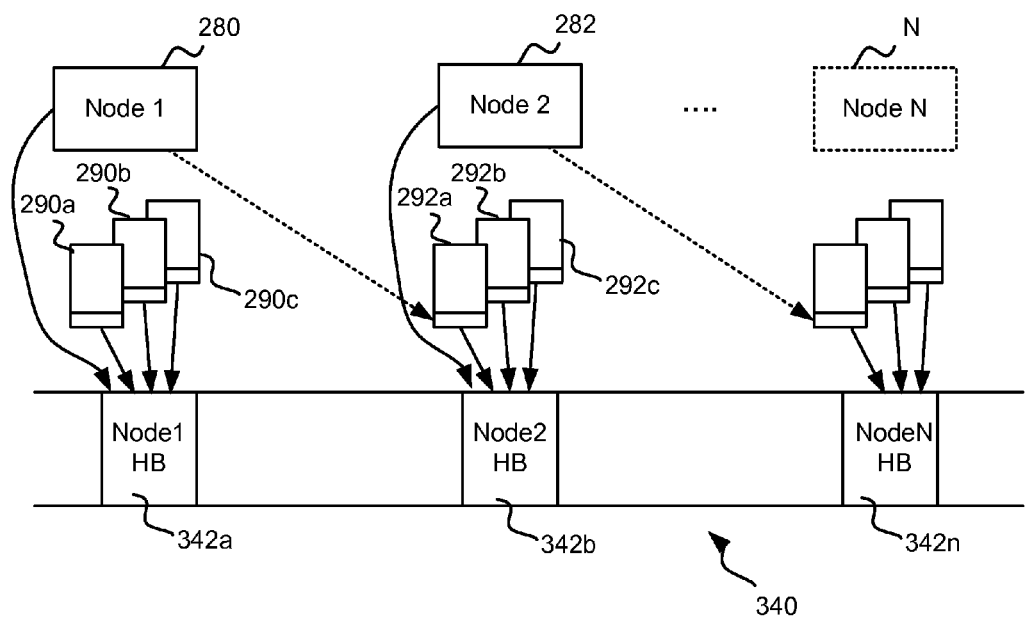
FIG. 3 illustrates conceptually a logical organization and relationship among a plurality of nodes, node instances, locks, and heartbeats in accordance with one or more embodiments the present invention.

FIG. 3 shows a logical organization and relationship among a plurality of nodes, locks, resources and heartbeats. In one embodiment, a node is any entity that shares the same resources with other nodes. As illustrated, node 280 may have associated therewith one or more locks 290a, 290b, 290c, . . . 290n, each associated with a resource. Each of locks 290a, 290b, 290c, . . . 290n held by node 280 have associated therewith a pointer data which identifies a heartbeat region 342a uniquely associated with an instance of node 280. Similarly, each of locks 292a, 292b, 292c, . . . 292n held by node 282 have associated therewith a pointer data which identifies a heartbeat region 342b uniquely associated with an instance of node 282. By requiring all nodes to refresh their respective heartbeat region within a system-wide time constant, a protocol which enables other nodes to determine whether a heartbeat and its respective locks are valid or stale is possible. For example, in FIG. 3 the solid curved lines from each of nodes 280 and 282 to their respective heartbeats indicate a refresh of the heartbeat data structure. Node N, illustrated in phantom, is an expired instance of a node. Node N is no longer refreshing its heartbeat; however, the locks associated with the node still point to its respective heartbeat 342n. If node 280 wishes to acquire a lock currently held by node 282, as illustrated by the dotted line emanating from node 280, then node 280 can determine from monitoring the heartbeat data structure if heartbeat 342b is still viable, which in this case is still "heartbeating". Therefore node 280 will have to wait to acquire the lock. In another embodiment, a failure to acquire a lock results in a failure of the lock operation. Conversely, if a process from node 282 wishes to acquire a resource currently locked by node N, as illustrated by the dotted line emanating from node 282, then node 282 can determine from monitoring the heartbeat data structure if heartbeat 342n is still viable, which in this case is "stale", and, therefore, node 282 may clear heartbeat 342n by modifying the state value thereof, and thereafter, node 282 is free to acquire one or more of the locks associated with heartbeat 342n.

In one embodiment, the disk is used to store a heartbeat segment 340. Heartbeat allocation is achieved by allocating a segment 340 of the disk that is big enough to hold a plurality of heartbeat regions 342, for example 10 Mbytes. Within this heartbeat segment 340, each of the heartbeat regions 342a, 342b, . . . 342n of a system may generally be at least as large as the minimum sector size on the disk. For example, on SCSI disks, each heartbeat region may be 512 bytes. Alternatively, the respective heartbeat regions 342a, 342b, . . . 342n as well as the overall heartbeat segment may have sizes chosen at the discretion of the designer to optimize memory usage as well as to accommodate the anticipated number of heartbeats associated with nodes within the system. In the present invention, the number of heartbeat regions 342 within heartbeat segment 340 is typically much greater than the maximum number of live nodes within the system. Unless otherwise noted herein, the term "heartbeat" is used interchangeably to refer to both the data structure 345 and the heartbeat region 342 on which the data structure resides.

The dynamic heartbeat allocation algorithm disclosed herein avoids any requirement to configure nodes ahead of time as part of a cluster. Once a node has allocated a heartbeat region, it can store configuration information about itself, e.g.

its IP address or host name, in the "other node-specific information" area 354 of heartbeat region 345, as well.

Figure 4:
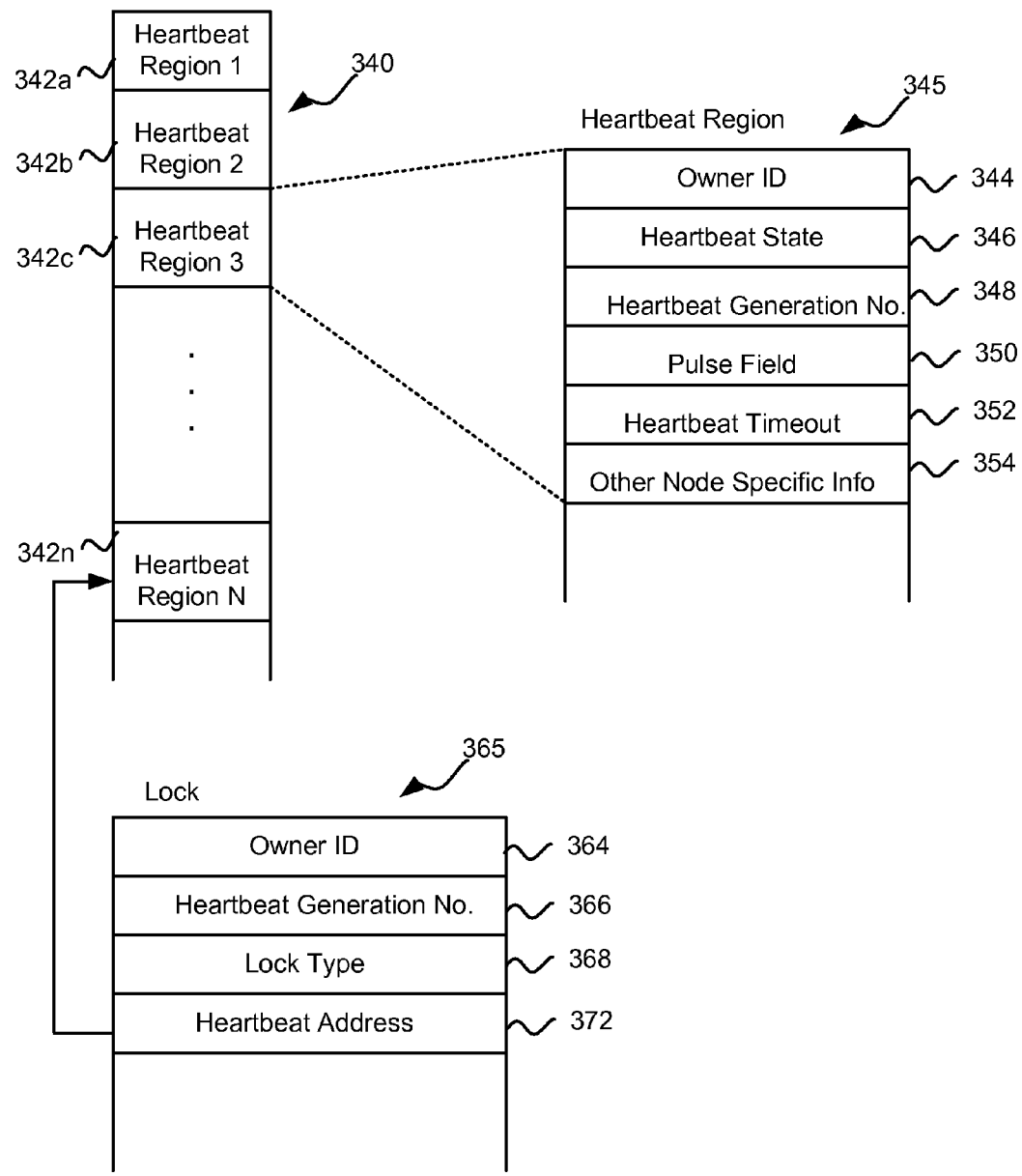
FIG. 4 illustrates conceptually a logical organization and relationship among a lock, a heartbeat region and the heartbeat segment in accordance with one or more embodiments the present invention.

In FIG. 4, the heartbeat data structure 345 that occupies heartbeat regions 342a, 342b, . . . 342n includes the following fields: Owner Identifier, Heartbeat State, Heartbeat Generation Number, Pulse Field, Other Node-Specific Information, and Heartbeat Time Out.

The Owner Identifier field 344, also referred to as the owner, uniquely identifies the node owning the heartbeat region and may be implemented with any data type, including, but not limited to, alphanumeric or binary, with a length chosen that allows for sufficient unique identifiers within the system. Any number of different identification schemes may be utilized provided that all nodes within a system may identify the node that currently owns a particular heartbeat region 342. In a preferred embodiment, a Universally Unique Identifier (UUID) is used to identify nodes. In an alternative embodiment, the owner field can be omitted as it is possible to uniquely identify a node instance using only the address of the heartbeat region and the heartbeat generation number. It should be noted, however, that the owner field enables various optimizations and eases debugging.

The heartbeat state field 346 indicates the current state of the heartbeat and may be implemented with any enumeration data type that is capable of assuming multiple states. In the illustrative embodiment, the heartbeat state value may assume any of the following states:

CLEAR—heartbeat is not currently being used;
IN_USE—heartbeat structure is being used by a node;
BREAKING—heartbeat has timed out and is being cleared by another node.

The heartbeat generation number 348 is a modifiable value that indicates the number of times the heartbeat region has been initialized and may be implemented with a 64-bit integer data type. The heartbeat generation number 348 may be modified, typically incremented each time the heartbeat region is allocated to a node. Together with the address of the heartbeat region, heartbeat generation number 348 may be used to uniquely identify a particular instance of a heartbeat. For example, the heartbeat generation number 348 may be used to determine if a node has de-allocated a heartbeat region and then re-allocated the same region. Accordingly, the heartbeat generation number enables other nodes to determine if a heartbeat is owned by the same instance of a node as recorded in the lock data structure.

The pulse field 350 is a value that changes each time the heartbeat is renewed (heartbeating) by its respective owner and may be implemented with a 64-bit integer data type. In one embodiment, pulse field 350 may be implemented with a timestamp. Alternatively, pulse field 350 may be implemented with another value that is not in a time format but is guaranteed to change each time the heartbeat is renewed. Other nodes can tell if the owner node is heartbeating by observing changes in the pulse field 350. The value of the pulse field 350 may be updated using a number of techniques. For example, the pulse field 350 may be incremented relative to an initial starting value derived internally from within the system. Alternatively, pulse field 350 may be set to the value of the local time, at the instant of renewal, etc. In the illustrative embodiment, there is no requirement for clocks to be synchronized across hosts for the lock-leasing technique disclosed herein to work.

The other node-specific information area 354 is undefined additional storage that does not require a specific data type to be associated therewith. This area of data structure 345 allows additional useful data to be stored along with the heartbeat specific data and may include data that is unique to or associated with the node that currently owns the heartbeat. For example, in the context of a distributed file system, a pointer to a journal file for the subject node, which can be replayed if the node crashes, may be stored within the other node-specific information area 354 of heartbeat data structure 345.

In the illustrative embodiment, an on-disk lock 365 may be implemented with a data structure that contains the address of the node holding the lock, a pointer to heartbeat region 342 of the node instance holding the lock, and the generation number of the heartbeat when the lock was acquired. In this manner, another node can verify if the locking node is still heartbeating and has not crashed since acquiring the lock. Locks may typically be stored within the same failure domain, such as the same disk, as heartbeat segment 340. In the present invention, a lock data structure 365 is associated with each resource within the system and may be maintained on disk.

In FIG. 4, a lock data structure 365 that may be associated with each resource within a system comprises the following fields: Owner Identifier (Node that owns the Lock) or Owner Universally Unique Identifier (UUID), Heartbeat Address, Heartbeat Generation Number, Lock Type, Other Lock Specific Information.

Owner Identifier field 364 may be implemented similar to that of Owner Identifier field 344 of heartbeat data structure 345. In the contemplated system, Owner Identifier field 364 and Owner Identifier field 344 may have the same value for a heartbeat which has not become stale or expired, that is, the node that owns the heartbeat, also owns all locks associated with that heartbeat. This requirement does not exist in the alternative embodiment in which an owner has not been specified in the heartbeat, even though the lock is free to contain an owner for optimization and debugging reasons.

The heartbeat generation number 366 may be implemented similar to that of heartbeat generation number 348 of heartbeat data structure 345. In the contemplated system, heartbeat generation number 348 and heartbeat generation number 366 may have the same value for a heartbeat which has not become stale.

The lock type field 368 indicates the type of lock associated with the resource and may be implemented with any enumeration data type that is capable of assuming multiple states. In the illustrative embodiment, the lock type field may typically have multiple values that will be defined by the number and types of locks available within the system. As such these values are left to the discretion of the system designer. The system described herein may be implemented with any lock type.

Typical types of locks may include any of a Null, Concurrent Read, Concurrent Write, Protected Read, Protected Write, or Exclusive lock type.

The heartbeat address field 372 identifies the location of the lock owner's heartbeat region and may be implemented with a pointer to the specific heartbeat region 342 of heartbeat segment 340 that contains the heartbeat data structure 345 corresponding to the owner of the heartbeat associated with the lock.

Optionally, lock data structure 365 may further comprise other lock specific information area (not shown) utilized for other data types to be associated therewith. This area of data structure 365 allows additional useful data to be stored along with the lock data and may include data that is unique to or associated with the node that currently owns the lock. In the present invention, a lock data structure 365 is associated with each resource within the system and may be maintained on a disk of the SAN. In the illustrative embodiment, each lock data structure 365 resides with its respective resource and is, therefore, mapped or associated with a system resource.

When a node attempts to gain access to a resource the node can immediately determine if the resource is locked by reading the lock data structure from disk. Depending on whether the techniques described herein are used with a traditional computer system or one which is completely or partially virtualized, the resource to lock mapping may vary at the discretion of the designer provided that some association is maintained there between. For example, such mappings may be implemented using one or more tables stored on disk or within the same failure domain as the heartbeat segment 340.

As described above, a lock state or type for every lock is maintained in the lock metadata region in a shared storage. In one embodiment, the lock type includes three values, "free," "managed," and "locked." It should be noted that these name values (e.g., free, managed, and locked) are only to illustrate the method of managing locks. Any other values or names may be used instead so long as the process of managing and acquiring locks as described throughout in this document is followed, either as stated or equivalent thereof. If a lock is in the "free" state, then any node may use a mutual exclusion primitive such as the SCSI reservation to acquire the lock. When the lock is acquired by a node, the lock state of the lock is changed to "locked" in the lock metadata. The "locked" status also means that the lock is being held in an exclusive mode by the current owner of the lock. However, since this process of acquiring a lock through a mutual exclusion primitive in a Storage Area Network is expensive, in one embodiment, if a node no longer needs a lock, the status of the lock is changed to "managed" in the lock metadata to indicate that the current owner though still holds the lock but the current owner would release the lock if requested. Further, a pointer in the lock metadata is maintained to identify the node that currently owns the lock. Through a use of this intermediate state, "managed," a use of the mutual exclusion primitive in acquiring locks is greatly reduced. When a node needs to acquire a lock, the lock metadata is probed to identify, 1) Who is the current owner of the lock, and 2) What is the current state of the lock. If the lock is in the "free" state, the lock is granted to the requesting node. If the lock is in the "locked" state, the heartbeat region of the node that currently owns the lock is probed to determine if the owning node is still alive. If the node is still alive, a message is sent to the requesting node to notify the requesting node that the lock is not free. However, if the owning node is not alive, the lock is released and the lock ownership is passed on to the requesting node. If the lock is in the "managed" state, then it means that the owning node no longer needs this lock but still holding it for another node to acquire the lock. In this case, the owning node is notified and the lock is granted to the requesting node and the lock metadata is updated correspondingly. If the lock is in the "locked," or "managed" state, in one embodiment, a lease time out (typically in high milliseconds or in seconds) value can be used to release a lock. In a normal operation, the owning node would update the heartbeat to extend the lease time out. However, if the owning node fails to update its heartbeat and therefore renew the lock lease (for example, due to the SAN failure or node failure), the lock can be released after the lease time is over. The following description will go over in details the process as described in this paragraph.

In a preferred embodiment, when a node needs a lock on a shared resource, the node checks the status of the lock in the local lock metadata that is in the node. In other embodiments, the local lock metadata may be stored outside a node. If the lock metadata is found in the local lock metadata of the node and the lock status indicates that the lock is being held in the "managed" mode, the node changes the lock status in the local lock metadata as well as the on-disk (i.e., shared storage) lock metadata storage to "held" and obtains the lock without triggering a mutual exclusion primitive such as the SCSI reservation process. If the local lock metadata of the node does not contain the lock metadata of the lock and the on-disk metadata indicates that the lock is free, then the node attempts to obtain the lock through a mutual exclusion primitive such as the SCSI reservation. If this attempt to obtain the lock is successful, a lock entry, with lock status as "held," is made in the local lock metadata of the node. This attempt may fail if another node managed to obtain the lock before the node. If the on-disk lock metadata indicates that the lock is held exclusively by another node, the node sends a message to another node to attempt to get the lock. If another node is still using the lock, another node may notify the node that the lock is not free. If another node is holding the lock in the "managed" mode, another node may release the lock to the node. In that case, the node obtains the lock without performing the SCSI reservation process and updates the on-disk as well as local lock metadata to indicate the ownership and status of the lock. In one example, it is possible that a third node also made the same request to another node and managed to obtain the lock. In this case, another node will notify the node that another node is no longer the owner of the lock. In case the another node fails to respond to the node's request, the node first checks the on-disk storage to verify if another node is still heartbeating. In this case, the node waits for a selected period of time before initiating another request to obtain the lock. However, if another node does not respond and also not heartbeating, the node attempts to break the lock through the SCSI reservation process.

Figure 5:
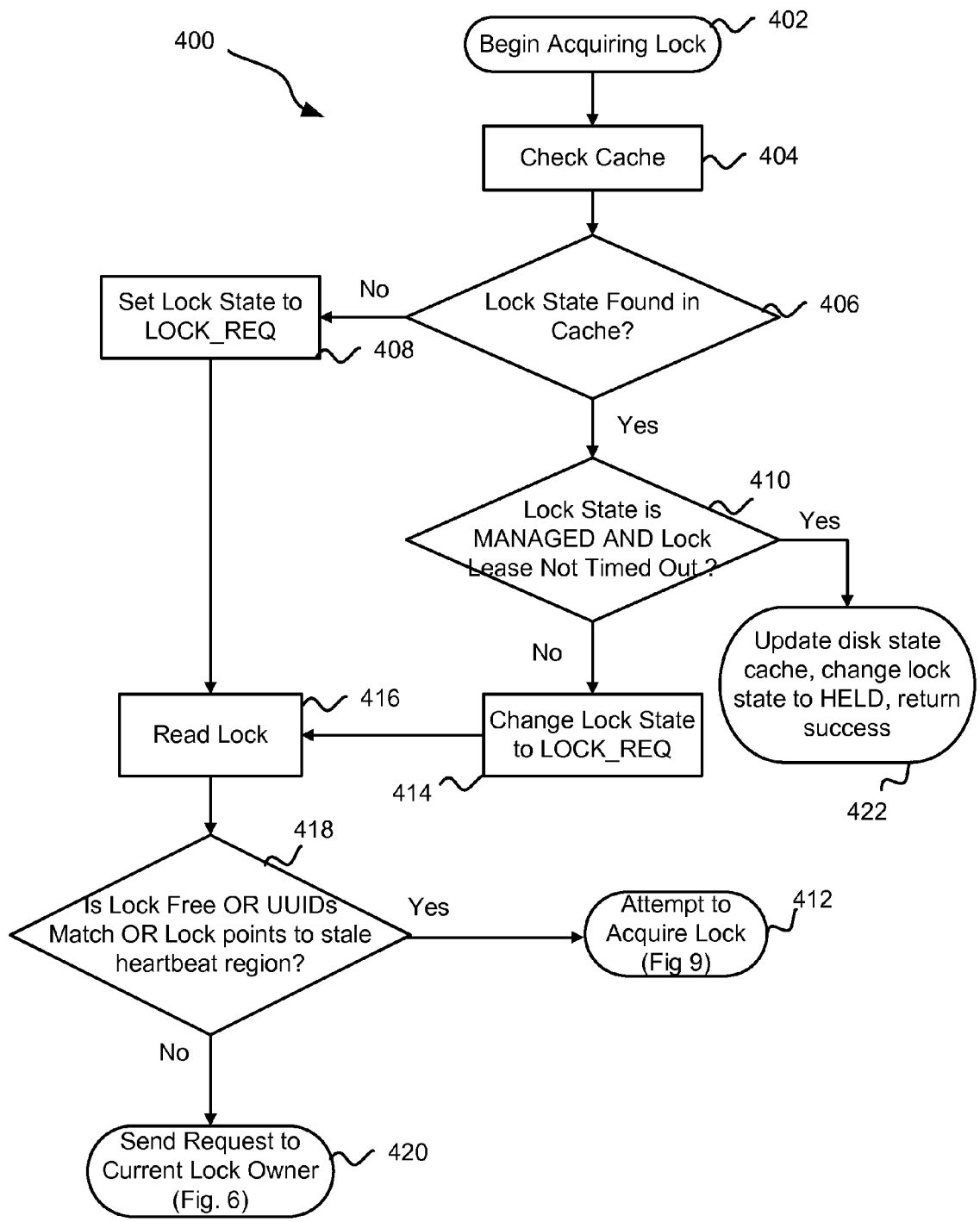
FIGS. 5-9 illustrate flow charts for acquiring lock in accordance with one or more embodiments of the present invention.

FIG. 5 illustrates a process 400 of acquiring a lock by a node. In one embodiment, the node maintains a local lock metadata of all locks that the node owns. In one embodiment, the local lock metadata is maintained in an in-memory cache. At step 402, the node begins acquiring a lock on a shared resource. At step 404, the local lock metadata is checked to determine if the lock being acquired is either already owned by this node or if another lock acquisition request for the same lock has already been made by this node. At decision step 406, a determination is made if a lock state of the lock being acquired is present in the local lock metadata. If no, at step 408, the lock state is set to "lock requested." Going back to decision step 406, if yes, then at decision step 410, a determination is made if the lock is in the "managed" state and the lock lease has not timed out. If no, at step 414, the lock state is changed to "lock requested." At step 416, the lock information is read from the heartbeat region.

If yes (at decision step 410), then at step 422, the lock state is updated in the shared storage of lock metadata, the lock state in the local cache is changed to "held" and a "success" message is returned. In other words, the lock is acquired without going through the process of a mutual exclusion primitive such as the SCSI reservation. At decision step 418, a determination is made if the requested lock is free, or if the owner's UUID stored in the lock metadata is same as the UUID of the requesting node, or if the lock points to a stale heartbeat region. As described earlier, lock metadata includes a location of a heartbeat region for a lock. If the lock is free, the lock does not point to a heartbeat region. Otherwise, the lock is being held by a node, the node will periodically update the heartbeat region to indicate that the node is alive and connected to the network. If yes, at step 412, the process of acquiring the lock is initiated as described further in FIG. 9. If no, at step 420, a request for lock release is sent to the current owner of the lock as described in FIG. 6.

Figure 6:
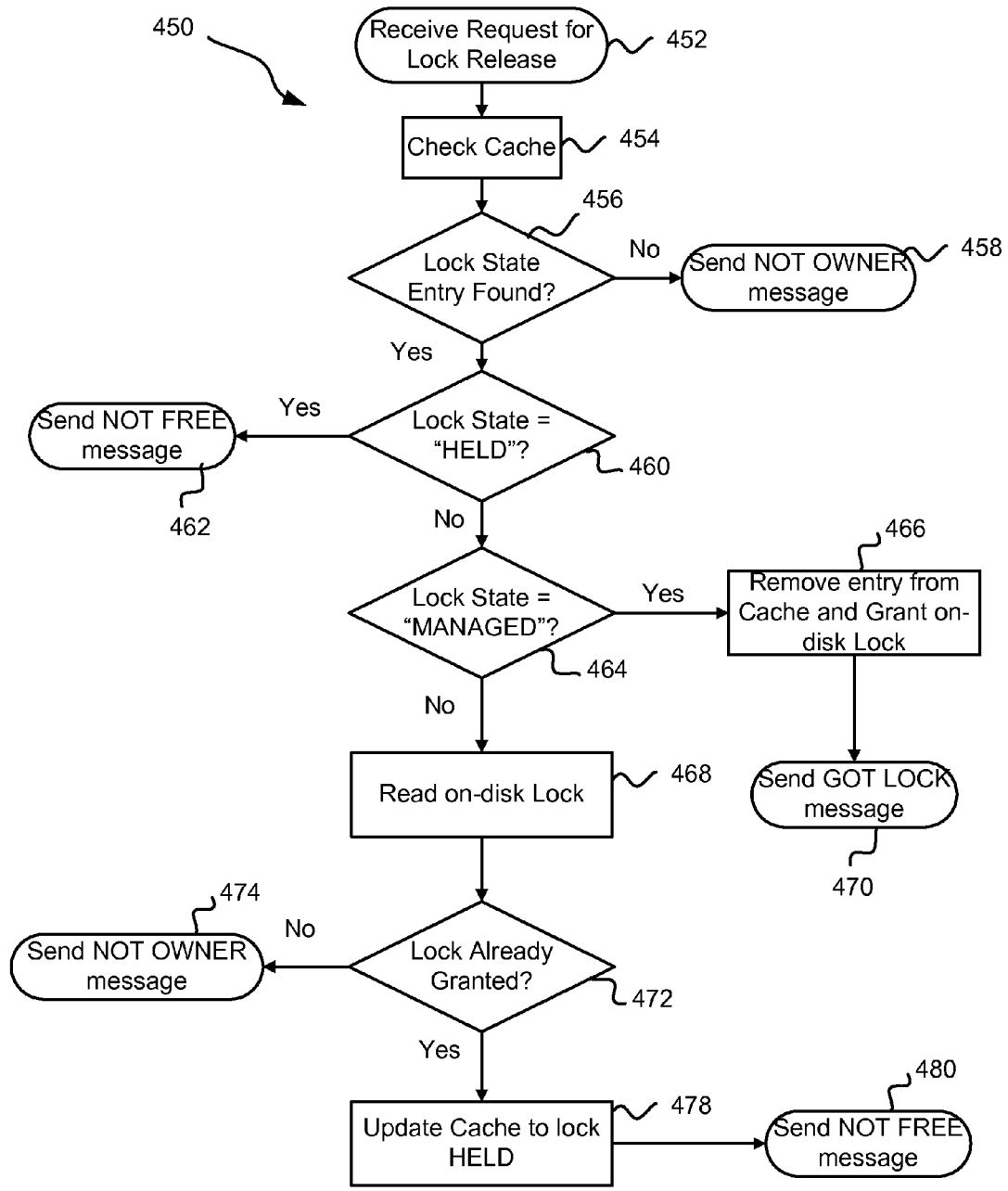

FIG. 6 illustrates a process of receiving a request for lock release 450. At step 452, a request for lock release is received from another node in the network. At step 454, the local lock metadata of currently owned or requested locks is checked. At decision step 456 the local lock metadata is checked to determine if a lock state entry exists in the local lock metadata. If no, at step 458, the requesting node is notified that this node is not the current owner of the lock. At decision 456, if yes, then the lock is either owned or requested by the receiving node. At decision step 460, if the lock state indicates that the lock is being "held" by the receiving node, at step 462, a message is sent to the requesting node to indicate that the lock is not free. If not, at decision step 464, if the lock state is "managed," at step 466, the lock status entry is removed from the local lock metadata and the on-disk lock is granted to the requesting node, then at step 470, a "GOT LOCK" message is sent to the requesting node to indicate that the lock is granted to the requesting node. If at decision step 464, the answer is no, then at step 468 the on-disk lock is read. At decision step 472, if the lock is already granted, then at step 478, the lock status is set to "held" and then at step 480, a message is sent to the requesting node to indicate that the lock is not free. If at decision step 472, the answer is no, then at step 474, a message is sent to the requesting node to indicate that the node, which is being requested to release the lock, is not the owner of the lock.

Figure 7:
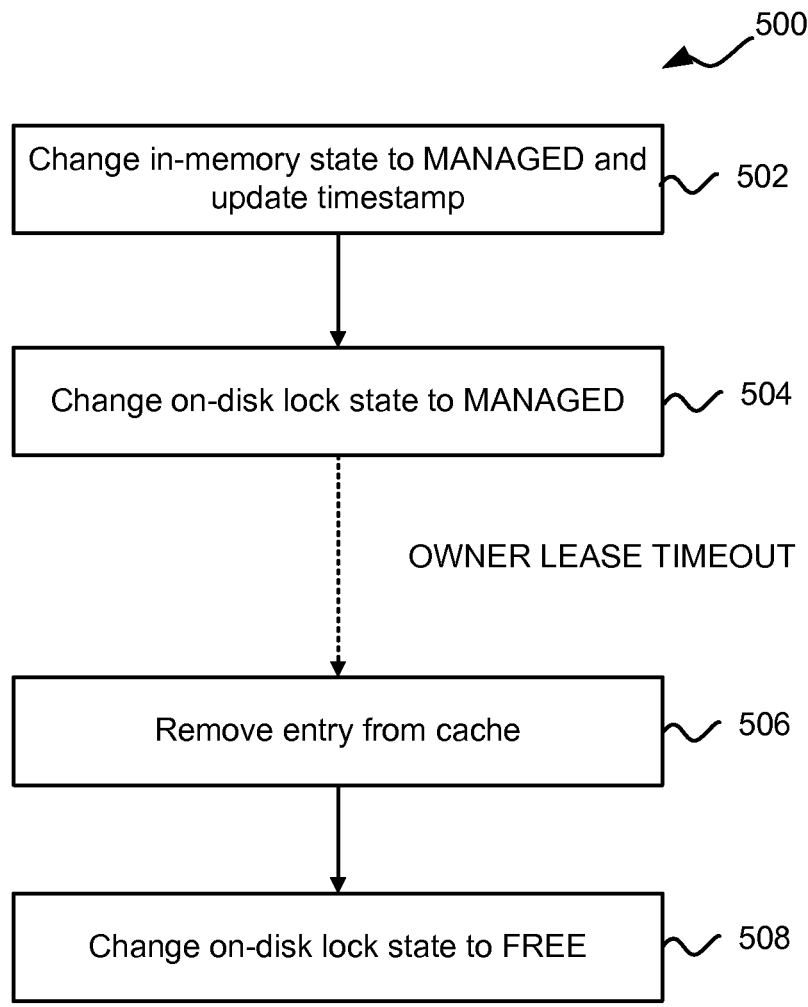

FIG. 7 illustrates the process 500 of releasing a lock. When a node needs to release a lock, at step 502, the node changes the lock state in the local lock metadata to "MANAGED" and updated the timestamp of the lock. Further, at step 504, the node changes the lock state in the heartbeat region in shared storage to "MANAGED" and updates the lock metadata with a new timestamp. It should be noted that the use of the word "MANAGED" is simply for illustrative purposes only. Any other appropriate flag or indicator can be used instead. This update of the lock status ensures that other nodes requesting the lock, will send a network message to this node rather than using a mutual exclusion primitive such as the SCSI reservation when they attempt to acquire a lock. The node continues to hold the lock in "MANAGED" state until a lock lease time. The lease can be renewed if the node requests the lock within the lease time. Once the lease on this 'MANAGED' lock expires, at step 506, the lock status is removed from the local lock metadata in the node and at step 508, the on-disk lock state (in shared storage) is changed to indicate that the lock is now free.

Figure 8A:
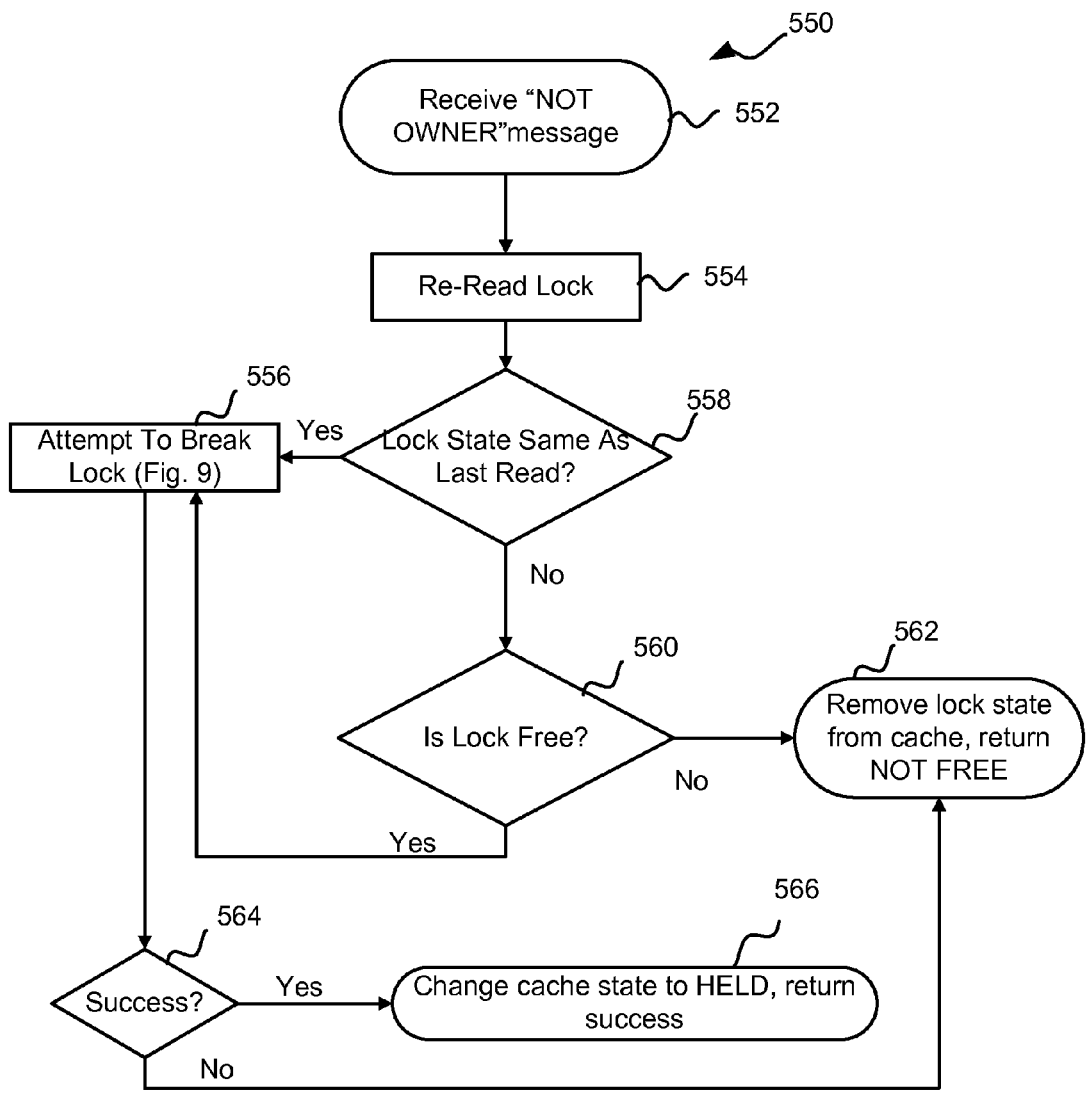

FIG. 8A illustrates a process 550 of processing a "not owner" (see FIG. 6, element 458) messages from another node. At step 552, a node receives a "not an owner" messages from another node in response to the node's request to release a lock. At step 554, the node re-reads the lock to determine if the lock is now available as the lock may have been released by the another node in the meantime, before the node sent a request. At decision step 558, if the lock state is not the same as the last read, at decision step 560, a determination is made if the lock is free. If yes, the control moves to step 556 to attempt to lock the break through the process as described in FIG. 9. If no, at step 562, a message is returned to indicate that the lock is not free. Going back to decision step 558, if yes, at step 556, the lock is attempted to be broken through the process described in FIG. 9. At decision step 564, if the attempt to break the lock is successful, then at step 566, the lock state in the local cache is changed to "held" and a "success" message is returned. If no, at step 562, a message is returned to indicate that the lock is not free.

Figure 8B:
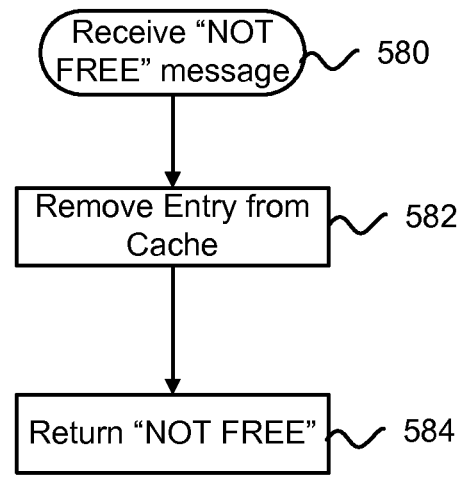

FIG. 8B illustrates a process of processing, by a node, a "not free" message. When a node send a request to another node to request a lock, the node makes an entry in its local cache that a request for a particular lock has been made. At step 580, a node receives a "not free" message back from another node. At Step 582, the lock status from the local lock metadata is removed and at step 584, a "not free" message is sent to the application or code that requested the lock.

Figure 8C:
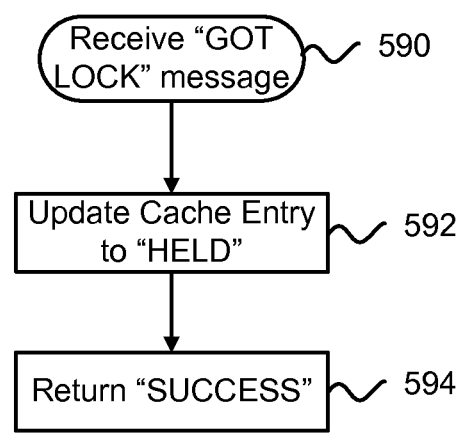

FIG. 8C illustrates a process of processing, by a subsystem, a "got lock" message. At step 590, a message indicating that the lock has been acquired pursuant to a lock request by a node, is received. At step 592, the local lock metadata of the node is updated to indicate that the lock is being held by the node. At step 594, a success message is returned to the application or code that requested the lock.

Figure 9:
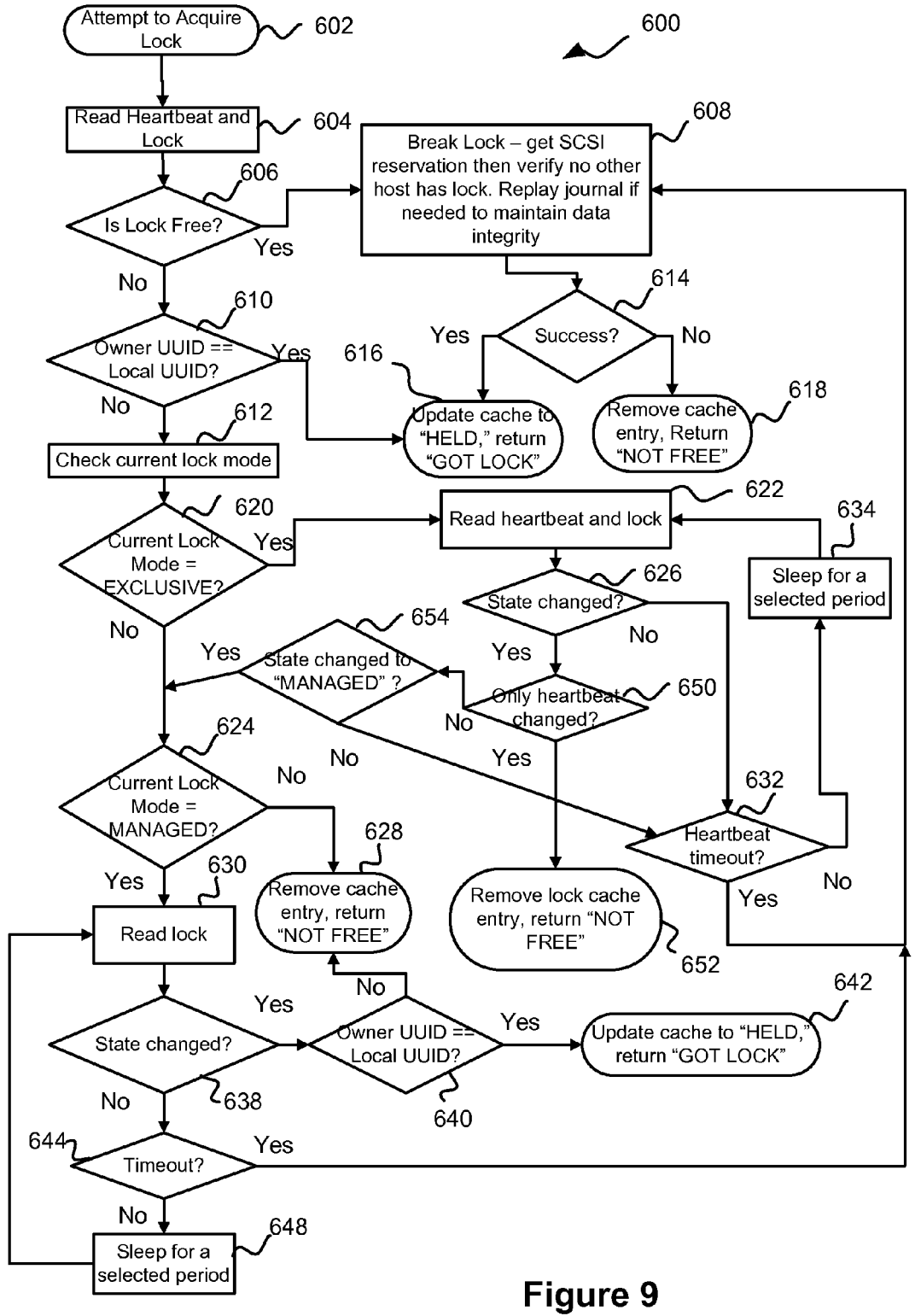

FIG. 9 illustrates a process 600 of attempting to break a lock. At step 602, when needed, a lock is attempted to be broken (see for example, FIG. 8A, element 556). At step 604, the heart beat region and lock metadata in shared storage is inspected to identify the current status of the lock. At decision step 606, if the lock metadata indicates that the lock is free, at step 608, the lock is attempted to be acquired through a mutual exclusion primitive such as the SCSI reservation. After acquiring the lock a filesystem or other kind of journal is replayed if needed to maintain data integrity. If no, at decision step 610, the lock owner's UUID as stored in the lock metadata is compared against the UUID of the requesting node. If UUIDs match, then at step 616, a message indicating that the lock has been acquired is sent to the application or code that requested the lock. If no, at step 612, the current lock mode is checked.

Going back to decision step 614, if the attempt to break the lock is successful, then at step 616, the shared cache is updated to "held" and a message indicating that the lock has been acquired is sent. If the attempt to break the lock was unsuccessful, at step 614, a message indicating that the lock is not free, is sent. This failure to acquire the lock may be due to the fact that between steps 606 and 608, another node may acquire the lock.

At decision step 612, a determination is made if the current lock mode is "exclusive." In one embodiment, the "exclusive" lock mode means that the lock is being held by a node. If yes, at step 622, the heart beat and the lock metadata is read again. At decision step 626, a determination is made if the lock state has changed. If no, at decision step 632, a determination is made if a heartbeat timeout has occurred. A heartbeat timeout may occur if the owner of the lock fails to update the heartbeat data in shared storage for a selected period of time. If yes, step 608 is repeated, which includes clearing the current owner of the lock, which has lost its lease by failing to heartbeat. If no, at step 634, the process is put to sleep for a selected period of time and then step 622 is repeated. If the answer at decision step 626 is yes, at decision step 650, a determination is made if only heartbeat has changed. If yes, at step 652, the lock cache entry is removed and a "not free" message is returned. If no at decision step 650, at decision step 654 a determination is made if the lock state has changed to "managed." If yes, then the control goes to decision step 624. If no, the control goes to decision step 632.

At decision step 624, a determination is made if the lock is in "MANAGED" mode. In one embodiment, a lock can be in managed mode if a node, which previously acquired the lock, no longer needs it but holding it until another node requests the lock. If no, at step 628, a message indicating that the lock is not free, is sent. If yes, at step 630, the lock metadata is read. At decision step 638, a determination is made if the lock state has changed since the last read. If yes, step 640 is executed. At decision step 640, the lock owner's UUID is compared with local UUID. If UUIDs match, at step 642, the shared cache is updated to "held" and a "got lock" message is sent. If UUIDs don't match, at step 628, the shared cache is updated to "held"

and a "not free" message is sent. If no, at decision step 644, a determination is made if the lock has timed out. A lock may be timed out if the current owner fails to renew the lock lease. If yes, step 608 is executed. If no, at step 648, the process of breaking the lock is put to sleep for a selected period of time and then step 630 is repeated.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method of acquiring a lock by a node, on a shared resource in a system of a plurality of interconnected nodes, the method comprising:
   (a) probing a local lock metadata of the node to determine if a lock metadata of the lock exists in the local lock metadata, wherein the lock metadata includes an identity of the lock and a lock status;
   (b) if the lock metadata does not exist in the local lock metadata, performing steps (i) to (iv),
      (i) reading shared lock metadata of the lock from a shared storage, the reading includes identifying a current owner of the lock and a current status of the lock;
      (ii) probing heartbeat region of the current owner of the lock to ascertain if the current owner is alive, wherein if the current owner is not alive, waiting for a lock lease time to run out and then acquiring the lock and updating the shared lock metadata to indicate that the lock is now owned by the node;
      (iii) if the current status of the lock indicates that the current owner is holding the lock in an exclusive mode, returning a message to the node to notify that the lock is not free;
      (iv) if the current status of the lock indicates that the current owner is holding the lock in a managed mode, sending a request to the current owner to release the lock, wherein if the current owner has already not released the lock to another requesting node, the lock is granted to the node without performing a mutual exclusive primitive operation on the shared resource, and the shared lock metadata is updated to indicate new lock ownership and lock status; and
   (c) if the lock metadata exists in the local lock metadata of the node, probing the lock status of the lock in the local lock metadata, if the lock status of the lock in the local lock metadata indicates that the lock being owned in a managed mode, changing the lock status of the lock in local lock metadata to indicate an exclusive use of the lock by the node and updating the shared lock metadata to indicate that the lock being owned by the node in an exclusive mode,
   wherein the managed mode means that the lock is being owned by the node but the lock is not being used by the node.

2. The method as recited in claim 1, wherein waiting for the lock lease time to run out includes probing, at a selected interval the heartbeat region of the current owner of the lock to ascertain if the current owner is alive, wherein the selected interval is a time period which is less than the lock lease time.

3. The method as recited in claim 1, wherein if the local lock metadata of the node does not indicate that the lock is being owned by the node, updating the local lock metadata to indicate that the lock is being requested.

4. The method as recited in claim 1, wherein acquiring the lock includes updating the local lock metadata to include information that the node owns the lock, and updating the lock metadata in the shared storage to add a pointer to point to the heartbeat region.

5. The method as recited in claim 4, wherein updating the lock metadata including updating lock timestamp.

6. The method as recited in claim 4, wherein updating the lock metadata includes updating a status of the lock.

7. The method as recited in claim 1, wherein a process of identifying if the lock lease has expired includes:

maintaining in storage at least one heartbeat data structure, the heartbeat data structure including:
   owner data identifying a current owner of the heartbeat;
   state data identifying a current state of the heartbeat;
   pulse data identifying a time of last renewal of the heartbeat; and
   allowing the heartbeat to be modified if the pulse data is not changed within a selected period of time.

8. The method as recited in claim 7, the heartbeat data structure further including generation data identifying a version of the heartbeat.

9. The method as recited in claim 8, further including:
   maintaining a lock data structure associated with one of a plurality of shared resources, the lock data structure including data identifying a heartbeat.

10. The method as recited in claim 9, wherein the data identifying the heartbeat includes one of owner data identifying a current owner of the heartbeat and address data identifying a location of the heartbeat.

11. A method of receiving, at a first node from a second node, a request to release a lock, the method comprising:
   inspecting a local lock metadata of the first node;
      sending a message to the second node indicating that the lock is in use if the local lock metadata includes information indicating that the lock is being owned in an exclusive mode;
      removing information of the lock from the local lock metadata and updating information in a heartbeat region corresponding to the lock to grant the lock to the second node if the local lock metadata includes information indicating that the lock being held by the first node but not in use; and
      returning back a message to the second node indicating that the lock is free,
      wherein the request to release is received via an IP network.

12. The method as recited in claim 11, wherein, if the local lock metadata does not include an information regarding the lock, returning back a message to the second node indicating that the first node is not an owner of the lock.

13. The method as recited in claim 12, wherein, on receipt of the message, the second node re-reads the lock metadata in the heartbeat region again to determine any change in a status of the lock.

14. The method as recited in claim 13, wherein if the status of the lock has not changed between a first read and the re-read, attempting to break the lock.

15. The method as recited in claim 13, wherein if the status of the lock has changed between a first read and the re-read, determining if the lock is free.

16. The method as recited in claim 11, wherein the heartbeat region includes at least one heartbeat data structure, the heartbeat data structure including:
   owner data identifying a current owner of the heartbeat;
   state data identifying a current state of the heartbeat; and
   pulse data identifying a time of last renewal of the heartbeat.

17. The method as recited in claim 16, further including
   allowing the heartbeat to be modified if the pulse data is not changed within a selected period of time.

18. A method of managing a lock on a shared resource on a network, the method comprising:
   maintaining a heartbeat region for the node, wherein the shared resource being accessible to the node and the heartbeat region being maintain on a shared storage on the network, the heartbeat region includes space to store heartbeats of the node and space to store a lock metadata of the lock;
   maintaining a local lock metadata in the node to store status of the lock when the lock is owned by the node; and
   wherein, when the node attempts to acquire the lock, checking in the local lock metadata to determine if the lock is already owned by the node, if the lock is not owned by the node, probing the lock metadata in the shared storage to retrieve the status of the lock and current owner of the lock, if the status indicates that the lock being held by another node in a managed mode, then requesting the another node to grant the lock to the node, wherein if the lock is granted to the node without a use of a mutual exclusive primitive,
   wherein the managed mode means that the lock is being owned by the node but the lock is not being used by the node.

19. The method as recited in claim 18, wherein if the lock is already owned by the node, updating the status in the lock metadata and the local lock metadata in the node to indicate that the lock is being held exclusively by the node.

20. The method as recited in claim 19, wherein when the node no longer needs the lock, updating the status of the lock in the lock metadata and the local lock metadata to indicate that the lock is now being owned by the node in the managed mode.

* * * * *